United States Patent
Guidetti

(10) Patent No.: US 7,185,751 B2
(45) Date of Patent: Mar. 6, 2007

(54) DEVICE AND METHOD FOR FORMING GROUPS COMPOSED BY A VARIABLE NUMBER OF PRODUCTS

(75) Inventor: Dario Guidetti, Grignasco (IT)

(73) Assignee: Cavanna S.p.A., Prato Sesia (IT)

( * ) Notice: Subject to any disclaimer, the term of this patent is extended or adjusted under 35 U.S.C. 154(b) by 0 days.

(21) Appl. No.: 11/182,561

(22) Filed: Jul. 15, 2005

(65) Prior Publication Data
US 2006/0104798 A1    May 18, 2006

(30) Foreign Application Priority Data
Jul. 15, 2004    (EP)    ................................ 04425528

(51) Int. Cl.
*B65G 47/30*    (2006.01)
(52) U.S. Cl. ................ 198/418.6; 198/429; 414/796.1
(58) Field of Classification Search ............ 198/418.6, 198/419.3, 426, 429; 414/795.4, 795.7, 796.1, 414/797.4, 797.9, 798.1
See application file for complete search history.

(56) References Cited

U.S. PATENT DOCUMENTS

| 3,338,370 A | 8/1967 | Maulini ........................ 198/24 |
| 3,889,824 A * | 6/1975 | Wood ........................ 414/790.3 |
| 4,374,559 A * | 2/1983 | Morton ........................ 198/429 |
| 4,439,100 A * | 3/1984 | Fichtner et al. ........... 414/796.1 |
| 4,611,705 A * | 9/1986 | Fluck ........................ 198/419.3 |
| 5,893,701 A | 4/1999 | Pruett ........................ 414/798.2 |

FOREIGN PATENT DOCUMENTS

GB        890768        3/1962

OTHER PUBLICATIONS

European Search Report for European Application No. 04425528.1, dated Dec. 17, 2004.

* cited by examiner

*Primary Examiner*—James R. Bidwell
(74) *Attorney, Agent, or Firm*—Heslin Rothenberg Farley & Mesiti P.C.; Victor A. Cardona

(57) ABSTRACT

A device for forming groups composed by a variable number of products including a path of advance along which, in use, a continuous array of products advances along a direction of advance with the products in mutual contact. An arresting member is included against which, in use, the continuous array of products comes in arresting contact at the end of the path of advance. A conveyor device removes from the continuous array successive groups of products from a terminal part of the array in contact with the arresting member. A regulator device varies selectively the position of the arresting member along said direction of advance. An accompanying device supports the array of products and control the velocity of displacement towards the arresting member.

12 Claims, 4 Drawing Sheets

DEVICE AND METHOD FOR FORMING GROUPS COMPOSED BY A VARIABLE NUMBER OF PRODUCTS

CROSS-REFERENCE TO RELATED APPLICATIONS

This application claims priority from European Patent Application No. 04425528.9, filed on Jul. 15, 2004, the entire disclosure of which is incorporated herein by reference.

The present invention relates to a device and method for forming groups composed by a variable number of products, for example for automatic packaging installations.

The product conveying systems of automatic packaging installations are often provided with devices able to form groups of products which are fed to a packaging station.

Each group can be formed by individual products, not packaged singly. In other cases, the groups are formed by previously packaged products which are collected in groups to form multiple packages of individually packaged products. To fix ideas, without thereby limiting the scope of the invention, the products discussed herein can be, for instance, food products such as biscuits.

In both cases, it is necessary to provide in the system for conveying the products a device which allows to subdivide a continuous array of products into successive groups. Moreover, it is often necessary to be able selectively to vary the number of products comprised in each group, for example to adapt the installation to different product packaging configurations.

The object of the present invention is to provide a device for forming groups of products, which allows rapidly to vary the number of products of each group without having to perform complex set-up operations on the product conveying system.

According to the present invention, said object is achieved by a device and by a method having the characteristics set out in the claims.

BRIEF DESCRIPTION OF THE DRAWINGS

The features and the advantages of the device according to the present invention shall become readily apparent from the detailed description that follows, provided purely by way of non limiting example, with reference to the accompanying drawings, in which.

DETAILED DESCRIPTION OF THE DRAWINGS

Figure 1:
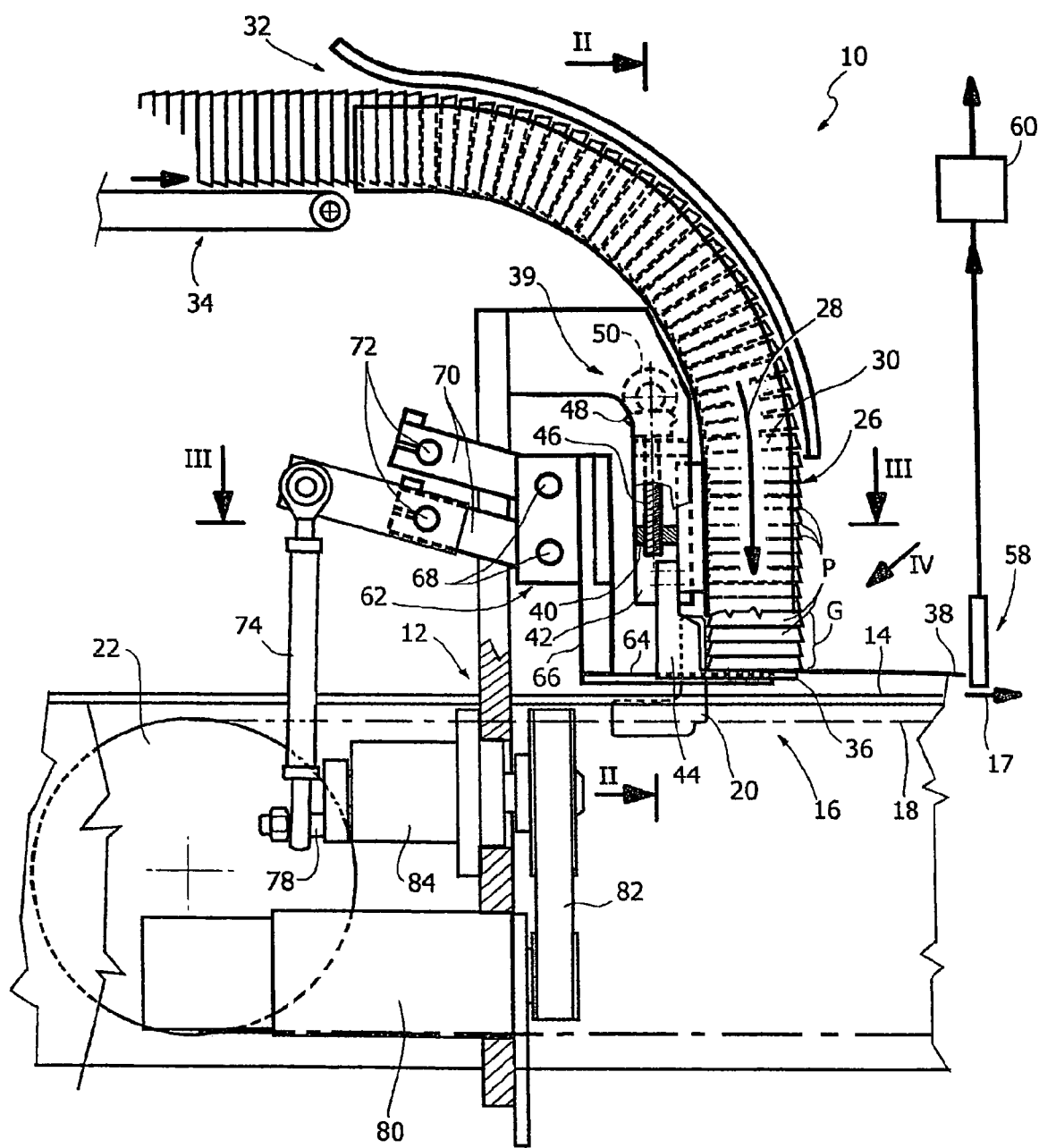
FIG. 1 is a lateral schematic view of a device according to the present invention.
Figure 2:
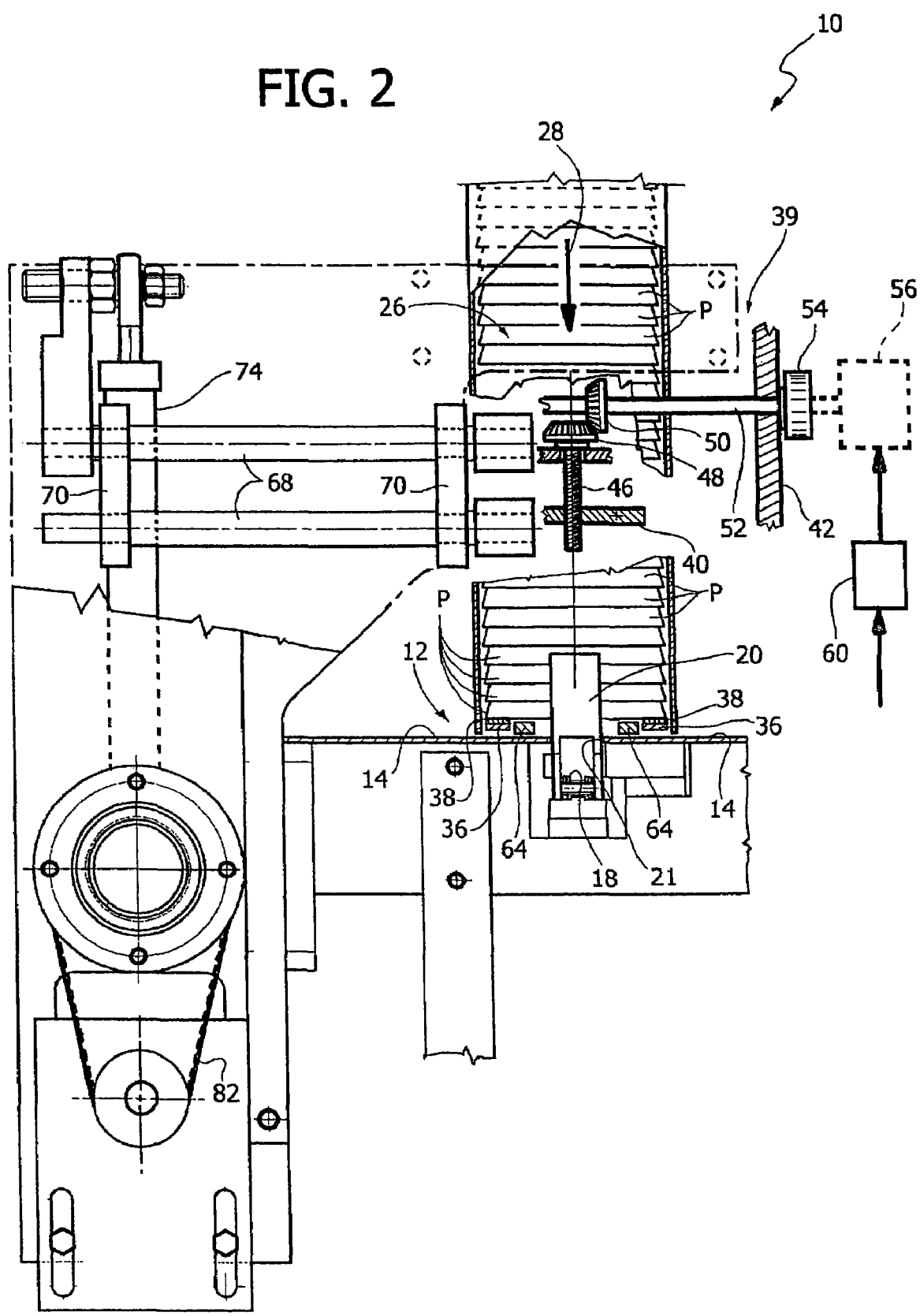
FIGS. 2 and 3 are schematic sections respectively according to the lines II—II and III—III of FIG. 1, and FIGS. 4 and 5 are enlarged scale views of the part indicated by the arrow IV in FIG. 1 illustrating two operative steps of the device according to the invention.
Figure 3:
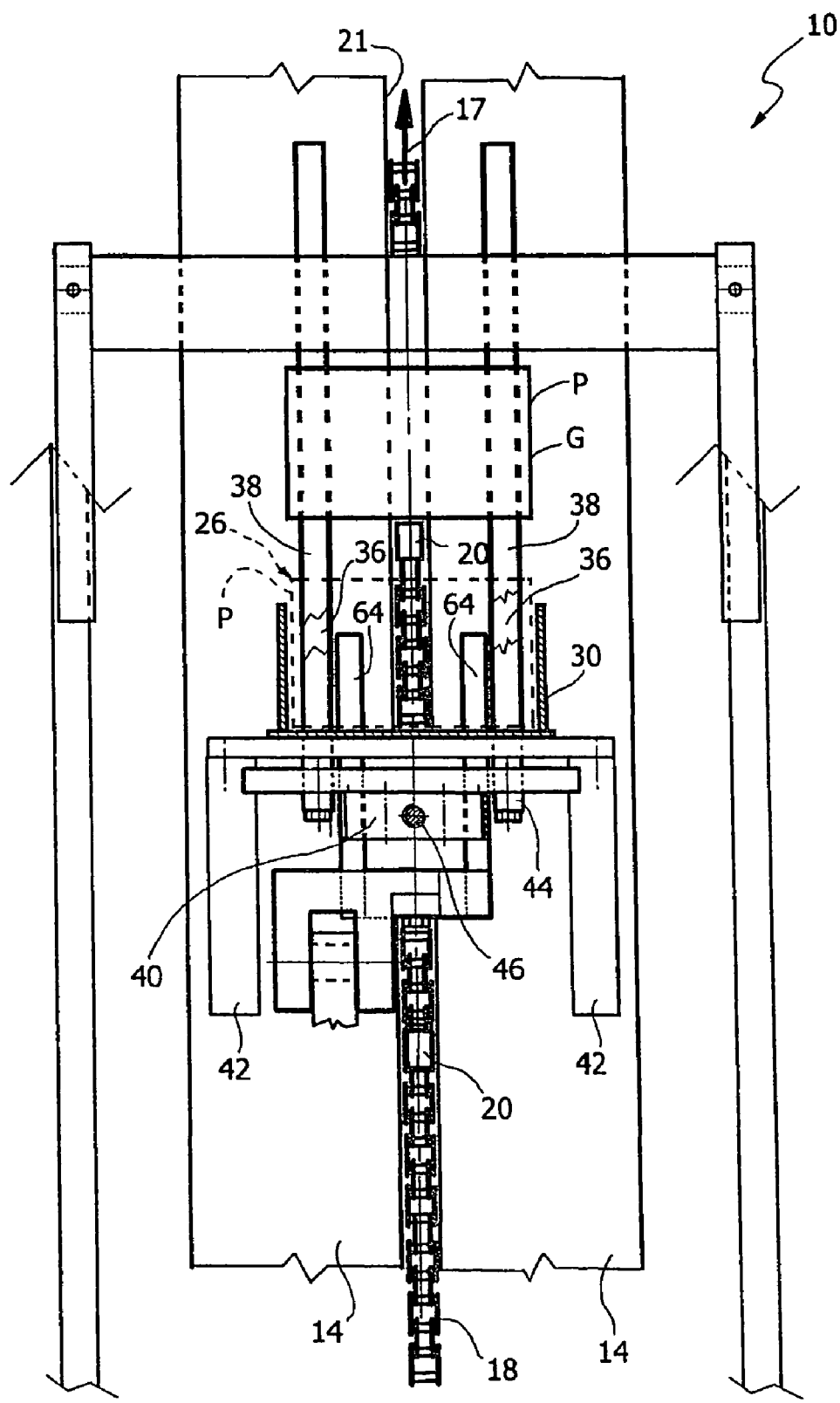

With reference to FIGS. 1 through 3, the reference number 10 designates a device for forming groups comprising a variable number of products (e.g., biscuits P) in a conveying system of an automatic packaging system, not shown in its entirety, but of a known type.

In the embodiment illustrated herein, which is as such, the device 10 comprised a stationary base 12 including a horizontal sliding surface 14.

A conveyor 16 is provided to advance groups G of products P in the direction indicated by the arrow 17 in FIG. 1. The conveyor 16 comprises, in the embodiment illustrated in the figure, a flexible element 18 such as a belt or a chain bearing a plurality of thruster member (usually called teeth or prongs) 20, only one of which is visible in FIGS. 1 and 2.

The flexible element 18 of the conveyor 16 co-operates with a motorised and with a transmission pulley. Only one of said pulleys is illustrated in FIG. 1 and it is designated by the reference number 22. The flexible element 18 has an upper horizontal branch which extends below the sliding surface 14. The thruster organs 20 are fastened at regular intervals to the flexible element 18 and, when they are on the upper branch of the conveyor 16, they project above the sliding surface 14 by a fixed quantity.

The sliding surface 14 is provided with a longitudinal opening 21 parallel to the flexible organ 18 and through which extend the thruster organs 20.

The device 10 comprises a path of advance 26 positioned above the horizontal sliding surface 14 along which a continuous array of products P advances in the direction indicated by the arrow 28 in FIG. 1 with the products P in contact with each other. The path of advance 26 has a terminal part 30 which extends according to a direction that is orthogonal or substantially orthogonal relative to the sliding surface 14. In the terminal part 30 of the path of advance 26 the products P form a continuous stack which tends to move towards the sliding surface 14. The path of advance of the products 26 is substantially in the form of a guide which contains the products stacked on top of each other in the direction of advance.

In the embodiment illustrated herein, the advance of the products P along the path 26 takes place by effect of gravity. The products are fed to an upper inlet section 32 of the path of advance 26 by means of a conveyor schematically designated with the reference 34 in FIG. 1.

However, it will be readily apparent to those versed in the art that the solution described herein also applies to situations in which the path of advance 26 is not vertical and/or the advance of the products P does not occur by gravity, but is achieved under the action of a motor member.

The device 10 comprises an arresting member 36 (see FIGS. 2 and 3 in this regard) positioned above the sliding surface 14. The continuous array of products P contained in the path of advance 26 thus bears on the arresting element 36. The arresting element 36 is preferably fork-shaped with two arms parallel to the direction of motion of the conveyor device 16 and between which are free to pass the thruster members 20.

The two arms of the arresting member 36 are connected to respective flexible laminas 38 (FIGS. 1 and 3) which join the arresting member 36 to the sliding surface 14. The flexible laminas 38 are parallel to each other and extend parallel to the direction of advance 17 of the conveyor device 16, from opposite parts of the through groove 21 in which the thruster members 20 move.

The position of the arresting member 36 is adjustable in the direction of advance 28 by means of a regulator device 39 better described below. The arresting member 36 can be moved upwards or downwards to decrease or increase the distance between the arresting surface of the products P contained in the path of advance 26 and the upper end of the thruster members 20.

This distance corresponds to the height of the groups G of products P which are drawn ("stripped") from time to time by the conveyor device 16 starting from the stack of products P located in the path of advance.

The adjustment of the position of the arresting member in the vertical direction can be obtained by mechanisms of various kinds. For example, an adjustment device could be used of the type shown in FIGS. 1 and 2, including a nut screw 40 guided in a fixed vertical guide 42 and fastened to a body 44 bearing the arresting member 36. The nut screw is engaged by a screw 46 fastened to a bevel gear 48 which meshes with a second bevel gear 50 borne by a horizontal shaft 52. The shaft 52 can be actuated in rotation in manual fashion by means of a knob 54 or by means of an electric motor 56. The rotation of the shaft 52 actuated by means of the knob 54 or by means of the electric motor 56 determines a movement of the arresting member 36 in the vertical direction.

A stated previously, by moving the arresting member 36 it is possible to vary the height of the group G of products P which are drawn every time a thrusting member 20 of the conveyor device 16 passes through the arresting member 36. By means of the regulator device 39 it is therefore possible to select the number of products P which are comprised in each group G.

If the adjustment of the position of the arresting member 36 is commanded by means of an electric motor 56, a correction circuit may be provided which automatically makes corrections to the vertical position of the arresting member 36 according to a measure of the height of the groups of products G.

For this purpose, a measuring device 58 (FIG. 1) is provided, for example of the optical type, able to measure the height of each group G of products which advances in the direction indicated by the arrow 17. A command device 60 sends a correction command to the electric motor 56 according to the height measurements made by the measuring device 58. This can be useful to adapt automatically the device 10 to any drifts in the manufacturing process of the products P which may lead, over time, to a variation in the thickness of the products P.

The device 10 according to the invention is preferably provided with a device for accompanying the products 62 including a grip/reception member 64 movable cyclically between a raised position and a lowered position. Preferably, the grip member 64 also has a fork shape with two arms parallel to the arms of the arresting member 36.

In the example shown in the figures, the mechanism that commands the cyclic movement of the grip member 64 comprises a body 66 bearing the grip member 64. The body is articulated in the points designated by the reference 64 to two arms 70 in turn articulated to the fixed structure 12 around two parallel axes 72. One of the two arms 70 is connected to an actuation mechanism including a connecting rod 74 and a crank 78. The crank 78 is actuated in rotation by an electric motor 80, for example by means of a belt transmission 82 and a reducer 84. The arms 70 and the body 66 provide an articulated parallelogram configuration. The rotation of the crank 78 produce the alternating oscillation of the arms 70 around the respective fixed axes 72 and, consequently, an alternating motion of the body 66 in the vertical direction. By effect of this alternating motion, the grip member 64 moves cyclically in the vertical direction between a position of drawing the array of products P (FIG. 4) and a position of depositing the array on the arresting member 36.

Figure 4:
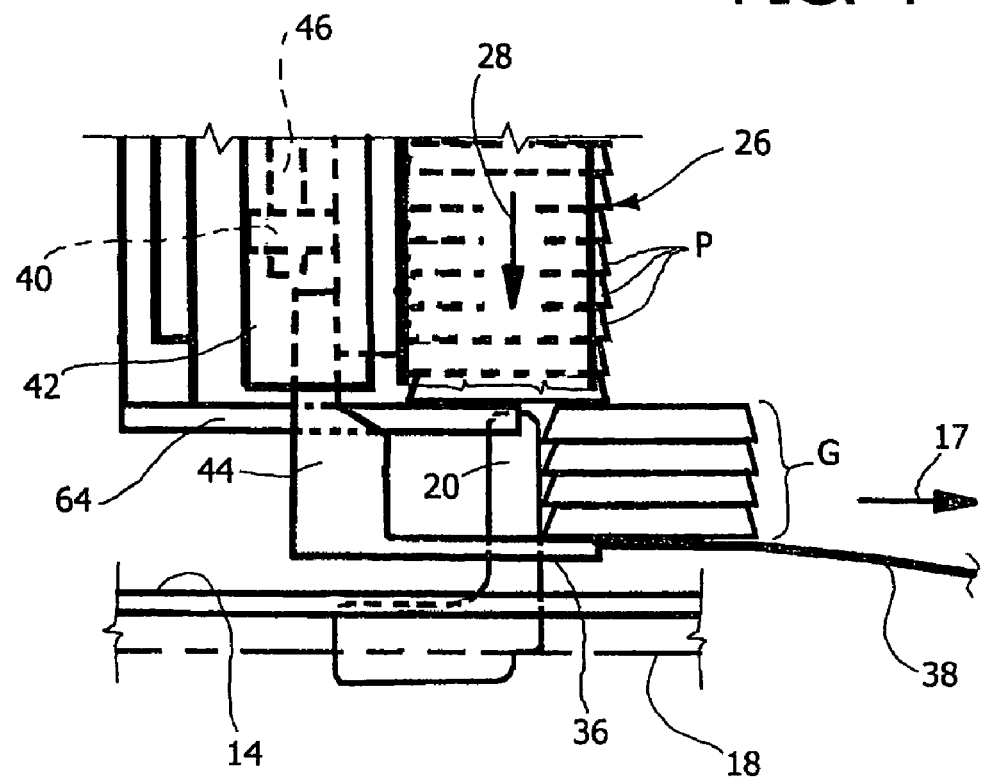

As shown in FIG. 4, when a thruster member 20 comes in contact with a group G of products P which bear on the arresting member 36, the grip organ 64 is in its lowered position in which it leaves the array of products P bearing on the support member 36. The thruster member 20 extracts a group G of products from the base of the array whilst the overlying array of products is sustained by the grip member 64.

Figure 5:
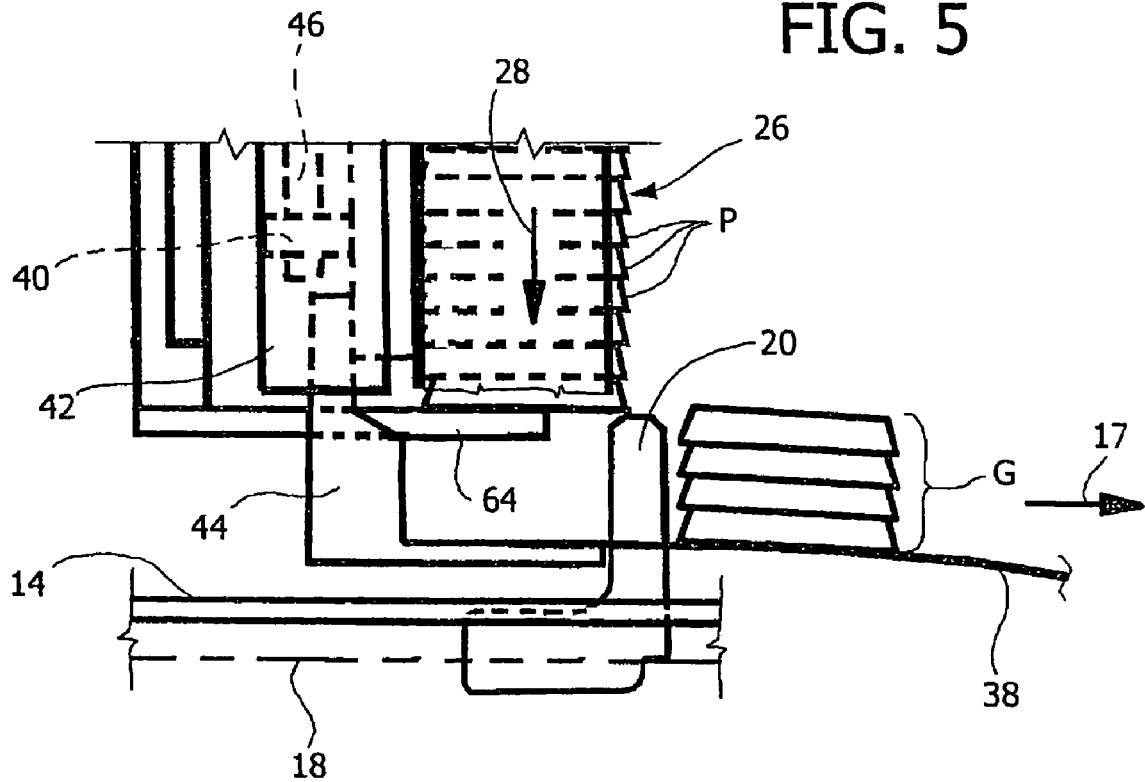

The thruster member 20 can then make the group G easily advance in the direction indicated by the arrow 17 in FIGS. 4 and 5. The group G slips on the flexible laminas 38 thrust by the thruster organ 20 until reaching, still under the thrust of the thruster organ 20, the sliding surface 14 in the point in which the flexible laminas 38 come in contact with the sliding surface 14.

As shown in FIG. 4, after a thruster member 20 has partially removed a group G of products P from the base of the array of products P contained the path of advance 26, the grip member 64 rises to support the column of products P, then drops until depositing the array of products P onto the upper surface of the arresting member 36.

The grip member 64 thus smoothly accompanies the array of products P and prevents a sharp drop of the arrays after the removal of a group of products.

The device for accompanying the products is useful especially in the configuration shown in the drawings, in which the terminal segment 30 of the path of advance of the continuous array of products extends in the vertical direction. However, the invention is not limited to this specific configuration.

The device according to the present invention could, for instance, operate in a configuration rotated by up to 90° around a horizontal axis with respect to the configuration of FIG. 1, i.e. in a situation in which the continuous array of products advances in a horizontal plane and the groups of products are removed in the vertical direction upwards or downwards. In this case, the device 66 for accompanying the products could be unnecessary.

Naturally, without altering the principle of the invention, the construction details and the embodiments may be varied, even to a significant extent, relative to what is described and illustrated herein, without thereby departing from the scope of the present invention as defined in the appended claims.

The invention claimed is:

1. A device for forming groups of products, comprising:
    a conveying structure defining a path of advance along a given direction for a continuous array of said products in mutual contact,
    an arresting member capable of co-operating in arresting contact with said continuous array of products at the end of said path of advance,
    a conveyor device to remove from the continuous array successive groups of products from a terminal part of the array in contact with the arresting member,
    a regulator device capable of selectively varying the position of the arresting member along said direction of advance to vary selectively the number of products included in said groups of products,
    a sensor element arranged to measure the height of said groups of products,
    a control unit arranged to receive from the sensor element a signal indicating the height of the groups of products, and
    a motor member commanded by said control unit and arranged to vary the position of the arresting member along said direction of advance as a function of the height of the groups of products measured by said sensor element.

2. Device as claimed in claim 1, wherein the path of advance has a terminal segment oriented according to a vertical or substantially vertical direction.

3. Device as claimed in claim 1, comprising a device for accompanying the products including a receiving member movable cyclically between a position of drawing the array of products and a position of depositing the array of products onto the arresting member.

4. Device as claimed in claim 1, wherein said regulator device comprises a command mechanism with screw and nut screw.

5. Device as claimed in claim 4, wherein said screw and nut screw mechanism is associated to a manual command.

6. Device as claimed in claim 4, wherein said screw and nut screw mechanism is associated to a motor member.

7. Device as claimed in claim 1, wherein the conveyor device comprises a motorised member bearing a plurality of thruster members acting on a sliding surface.

8. A device for forming groups of products, comprising:
   a conveying structure defining a path of advance along a given direction for a continuous array of said products in mutual contact,
   an arresting member capable of co-operating in arresting contact with said continuous array of products at the end of said path of advance,
   a conveyor device to remove from the continuous array successive groups products from a terminal of the array in contact with the arresting member,
   a regulator device capable of selectively varying the position of the arresting member along said direction of advance to vary selectively the number of products included in said groups of products;
   wherein said arresting member is fork-shaped with two parallel arms between which are capable of passing said bruster members; and
   wherein said parallel arms of the arresting member bear respective flexible laminas which join the arms of the arresting member to said sliding surface.

9. A method for forming groups of products, comprising the steps of:
   making a continuous array of products in mutual contact advance along a direction of advance,
   positioning an arresting member at one end of said path of advance,
   removing from the continuous array successive groups of products from a terminal part of the array in contact with the arresting member,
   selectively adjusting the position of the arresting member along said direction of advance, to vary selectively the number of products included in said groups of products;
   measuring the height of said groups of products; and
   varying the position of the arresting member along said direction of advance, as a function of the measured height of the groups of products.

10. Method as claimed in claim 9, comprising the step of accompanying the array of products in the direction of advance after the removal of each group of products.

11. Method as claimed in claim 10, comprising the steps of:
    providing a member for receiving the products, and
    cyclically moving said receiving member between a position of drawing the array of products and a position of depositing the array of products on the arresting member.

12. A device for forming groups products, comprising:
    a conveying structure defining a path of advance along a given direction for a continuous array of said products in mutual contact,
    an arresting member capable of co-operating in arresting contact with said continuous array of products at the end of said path of advance,
    a conveyor device to remove from the continuous array successive groups of products from a terminal part of the array in contact with the arresting member,
    a regulator device capable of selectively varying the position of the arresting member along said direction of advance to vary selectively the number of products included in said groups of products,
    a device for accompanying the products including a receiving member movable cyclically between a position of drawing the array of products and a position of depositing the array or products onto the arresting member, and
    said receiving member being vertically moveable from a lower end of said conveying structure to said arresting member to lower cyclically the products from the end of the conveying structure to an upper surface of the arresting member.

* * * * *

UNITED STATES PATENT AND TRADEMARK OFFICE
CERTIFICATE OF CORRECTION

PATENT NO. : 7,185,751 B2 Page 1 of 1
APPLICATION NO. : 11/182561
DATED : March 6, 2007
INVENTOR(S) : Guidetti It is certified that error appears in the above-identified patent and that said Letters Patent is hereby corrected as shown below:

Column 5, line 32, delete "bruster", insert --thruster--

Signed and Sealed this

First Day of May, 2007

JON W. DUDAS
*Director of the United States Patent and Trademark Office*